Figure 1:
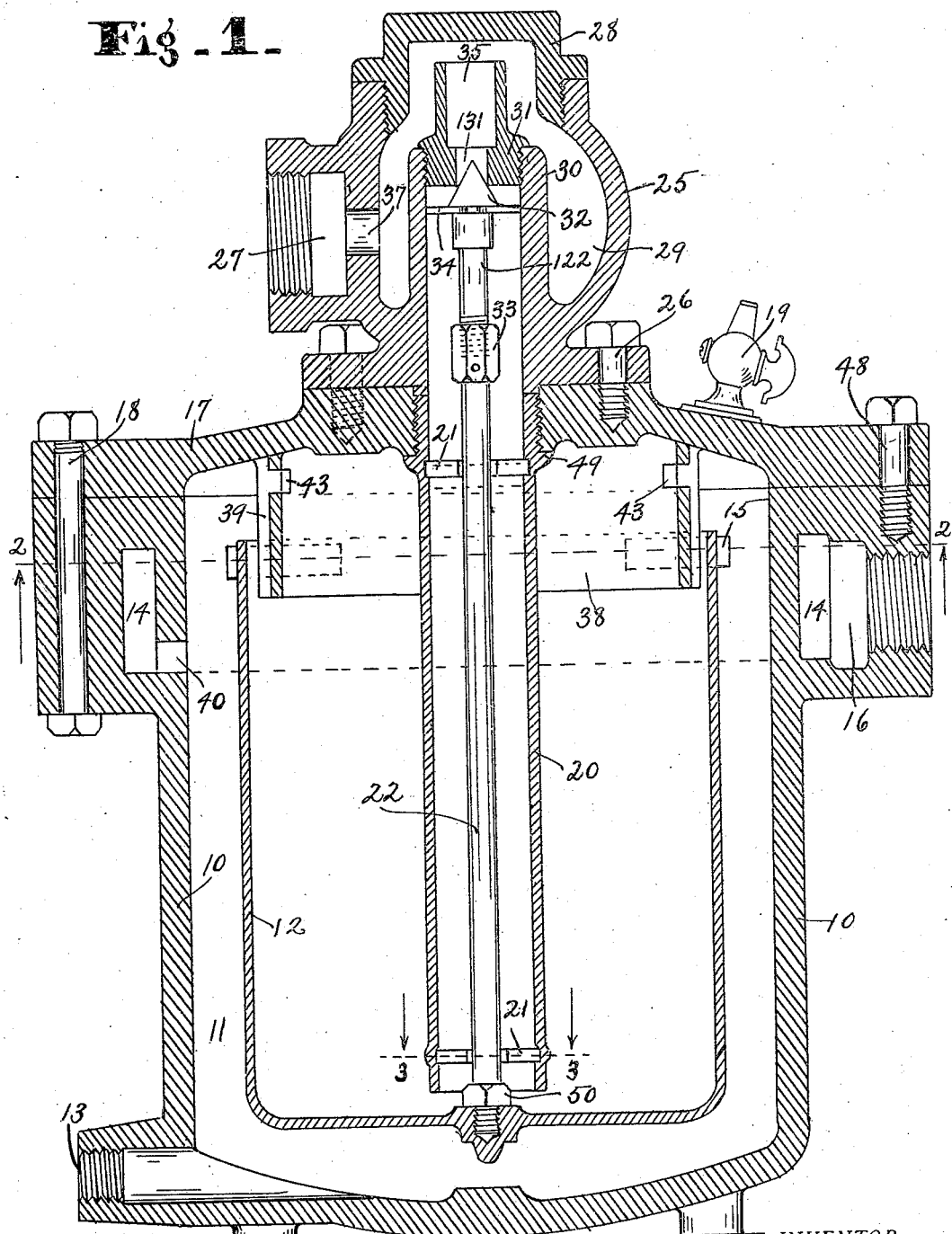

C. STICKLE.
STEAM TRAP.
APPLICATION FILED APR. 29, 1909.

944,295.

Patented Dec. 28, 1909.
2 SHEETS—SHEET 1.

WITNESSES:
W. M. Gentte.
O. McLaughlin

INVENTOR.
Cole Stickle.
BY
V. H. Lockwood
ATTORNEY.

C. STICKLE.
STEAM TRAP.
APPLICATION FILED APR. 29, 1909.
944,295.
Patented Dec. 28, 1909.
2 SHEETS—SHEET 2.
Fig-2-
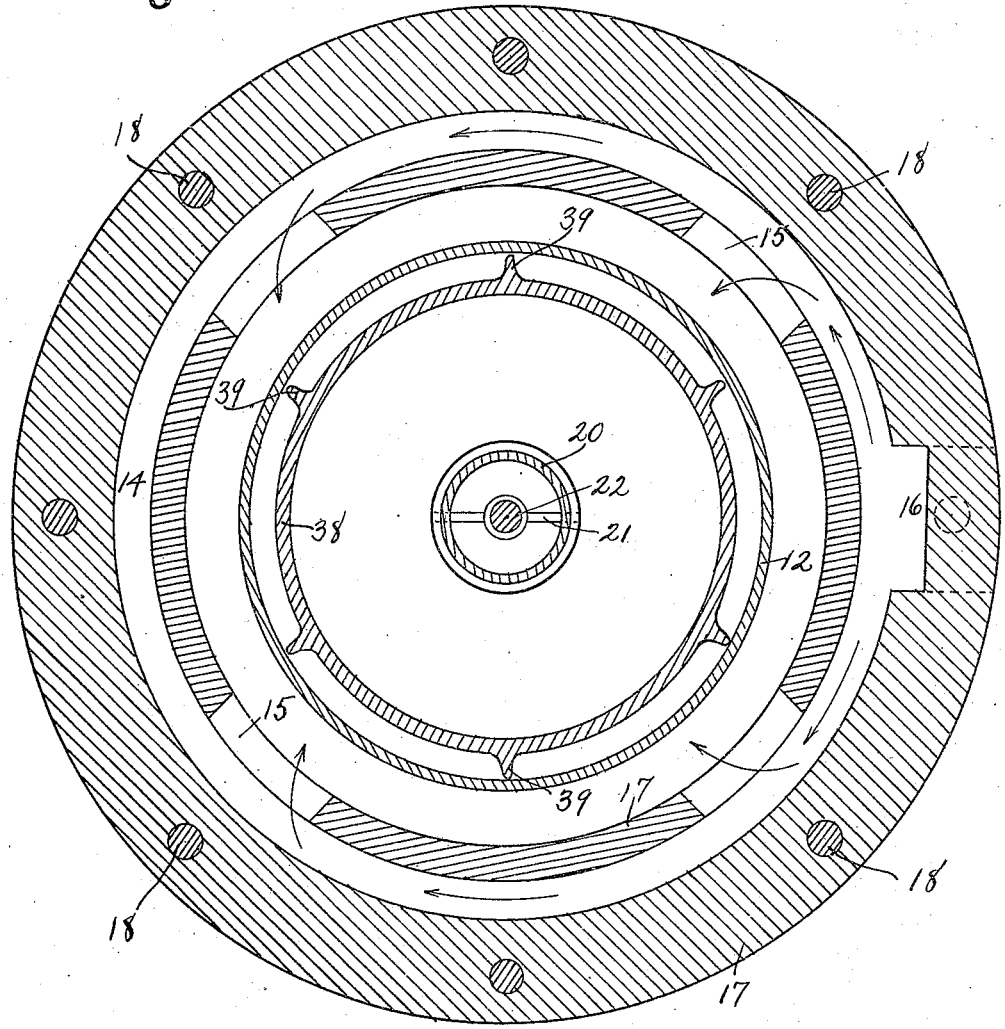
Fig-3-
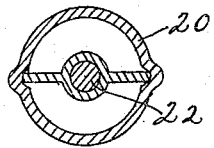
WITNESSES:
W. M. Gentle.
O. McLaughlin
INVENTOR.
Cole Stickle.
BY
V. H. Lockwood
ATTORNEY.

UNITED STATES PATENT OFFICE.

COLE STICKLE, OF INDIANAPOLIS, INDIANA, ASSIGNOR TO THE OPEN COIL HEATER AND PURIFIER COMPANY, OF INDIANAPOLIS, INDIANA, A CORPORATION.

STEAM-TRAP.

944,295.

Specification of Letters Patent.   Patented Dec. 28, 1909.

Application filed April 29, 1909.  Serial No. 492,854.

*To all whom it may concern:*

Be it known that I, COLE STICKLE, of Indianapolis, county of Marion, and State of Indiana, have invented a certain new and useful Steam-Trap; and I do hereby declare that the following is a full, clear, and exact description thereof, reference being had to the accompanying drawings, in which like numerals refer to like parts.

The object of this invention is to improve the construction and operation of steam traps and is in the nature of an improvement on that set forth in my former application No. 446,064, filed July 30, 1908.

The nature of the improvement will be understood from the accompanying drawings and the following description and claims:

In the drawings Figure 1 is a central vertical section through the device with the bucket in its elevated position. Fig. 2 is a horizontal section through the device on the line 2—2 of Fig. 1. Fig. 3 is a section on the line 3—3 of Fig. 1.

In detail 10 is a casing to provide a chamber 11 for bucket 12. There is an outlet 13 at the lower end that is normally closed. There is an annular chamber 14 in the upper part of the casing 10, which chamber 14 has horizontally disposed openings 15 leading into the bucket chamber 11. An opening 40 leads from the lower part of the annular chamber 14 in the bucket chamber 11 for the escape of any sediment or the like from said chamber 14. The upper edges of the openings 15 are substantially on a level with the top of the bucket when up, and said openings are slightly above the top of the bucket when it is down. The condensation water enters the chamber 14 from the inlet 16. There is a top 17 for the casing 10 secured by bolts 18 and screws 48. There is also an air vent or valve 19 in said top. The top is centrally apertured to receive the tube 20 that extends down centrally into the bucket 12 nearly to the bottom thereof. Said tube is open at both ends and has near the upper end an external annular shoulder 49 that fits against the underside of the top 17. There is a horizontal rib 21 secured diametrically to the tube near its lower end and another one near its upper end. These ribs have centrally located holes and serve as guides for the vertical movement of the valve stem or rod 22. This valve stem screws into the bottom of the bucket and is held tightly in place at that point by a nut 50, and operates freely through said guides 21. There is an upper casing 25 secured on the top 17 of the main casing 10 by screw bolts 26. Said upper casing has a lateral outlet 27 and also a top opening, which is closed by the screw cap 28. There is a chamber 29 within said casing 25 and in said chamber there is an upward tubular projection 30 internally threaded to receive the valve seat 31. Said valve seat has a relatively narrow port 131 in the lower end thereof and a larger opening or passageway 35 in the upper end thereof. The smaller port 131 is closed or regulated by the tapering valve 32, which is mounted on a short valve stem 122 that is flexibly connected at its lower end by the sleeve 33 with the upper end of the long valve stem or rod 22. A spider 34 is secured on said valve 32 and engages the inner wall of the tubular extension 30 and guides said valve in its vertical movements. The chamber 29 has an outlet port 37 leading to the outlet opening 27 and relatively reduced so that it tends to retard the escaping movement of the condensation water.

In operation the rod 22 will maintain the bucket 12 in its vertical position, and since there is practically no friction between said rod 22 and the guides 21 in the tube 20, there is no appreciable friction or resistance to the vertical movement of the bucket, and that is a very important feature in the prompt operation of the device.

To prevent lateral movement of the upper end of the bucket while the same is being handled, or at any other time so as to strain its connection with the rod 22, a downward extension 38 from the top of the casing is provided, which comes into close proximity with the upper end of the bucket but does not touch the same, so that it prevents such lateral movement of the upper end of the bucket and yet does not cause friction during the operation of the device.

The form of this extension 38, as shown herein, is that of an annular wall or plate, and as here shown it projects downwardly within the bucket, although that is not necessary, and it is provided with external vertical ribs, which project more closely to the bucket than the main part of the extension 38. This increases the space between the bucket and the main part of the extension 38 without diminishing the effectiveness of said extension by way of limiting the lateral movement of the top of the bucket. This leaves the bucket normally free from friction. When said downward extension 38 is an annular wall, as herein shown, it is provided on opposite sides with four steam openings 43 for the free admission of steam from the upper part of the chamber 11 into the upper part of the bucket.

The condensation water first enters chamber 14 and when said chamber is filled, said water flows over the lower edges of the openings 15 into the chamber 11, while the steam enters the upper part of the chamber 11 through the upper parts of the openings 15, that is, above the water flowing through said openings. When the chamber 11 is filled to a level with the bucket, the overflow is in the bucket. After water has accumulated in the bucket to the desired extent, it descends and opens the valve 32, and then the steam which has entered the upper part of the bucket through openings 43 from the upper part of the chamber 11 forces the water out of the bucket up through the tube 20, ports 131 and 35, chamber 29, port 37 and outlet 27. When at any time sufficient water has been forced out of the bucket 12 to cause it to rise out of the water, it will close the port 131. Thus it is seen that the bucket and rod 22 are so mounted that they are comparatively free from friction in their vertical movements and that the top of the bucket will normally remain out of contact with anything, but the extension prevents appreciable lateral movement of the top of the bucket at any time so as to interfere with the connection of the bucket with the rod 22, and the trueness of the relation between the bucket and said rod 22 during the operation of the device. The steam can freely enter the bucket through the ports 43 without interference with the passage of water between the upper edge of the bucket and the annular extension 38, and the ribs 39 leave room enough for the movement of the water into the bucket.

The rod 22 is made of metal and springs to some extent if the top of the bucket be moved laterally, and then the resiliency of the rod returns the bucket at once to its normal upright position and holds the bucket out of contact with the extension 38. Said extension 38 prevents lateral movement of the upper part of the bucket to a sufficient extent to prevent breaking the rod 22 in shipment or violent operation, but in normal operation said rod 22 holds the bucket true and out of touch with the extension 38.

What I claim as my invention and desire to secure by Letters Patent is:

1. A steam trap including a casing provided with a bucket chamber and an outlet opening, a bucket in said chamber, a valve for closing said outlet opening, a rod centrally secured to the bottom of the bucket for controlling the operation of said valve, means for vertically guiding said rod, and means extending down from the top of the casing into proximity with the top of the bucket but normally out of engagement therewith so as to limit the lateral movement of the top of the bucket.

2. A steam trap including a casing provided with a bucket chamber and an outlet opening, a bucket in said chamber, a valve for closing said outlet opening, a spring rod centrally secured to the bottom of the bucket and at its upper end flexibly connected with said valve, means for vertically guiding said rod, and means extending down from the top of the casing that limits the lateral movement of the top of the bucket but is normally out of engagement with the bucket.

3. A steam trap including a casing provided with a bucket chamber and with an outlet opening, a bucket in said chamber, means controlled by the bucket for opening and closing the outlet, and an annular extension from the top of the casing into the bucket provided with external vertical ribs that prevents lateral movement of the upper end of the bucket, which extension is provided with steam ports through the upper part thereof for permitting steam into the upper part of the bucket, substantially as set forth.

In witness whereof, I have hereunto affixed my signature in the presence of the witnesses herein named.

COLE STICKLE.

Witnesses:
   G. H. BOINK,
   O. M. McLAUGHLIN.